United States Patent [19]
Codatto

[11] Patent Number: 5,326,085
[45] Date of Patent: Jul. 5, 1994

[54] DEVICE FOR SUPPORTING SLABS DURING THE PHASES OF PUNCHING AND IN GENERAL OPERATIONS OF PLASTIC DEFORMATION

[75] Inventor: Antonio Codatto, Lonigo, Italy

[73] Assignee: Sapim Amada S.P.A., Turin, Italy

[21] Appl. No.: 24,513

[22] Filed: Mar. 1, 1993

[30] Foreign Application Priority Data

Mar. 18, 1992 [IT] Italy .................. VI92A000045

[51] Int. Cl.⁵ .............................. B25B 11/00
[52] U.S. Cl. ...................... 269/20; 269/266; 269/296; 269/290
[58] Field of Search .......... 269/20, 21, 266, 309, 269/310, 296, 290; 294/64 R; 298/363; 51/235; 279/3 R

[56] References Cited

U.S. PATENT DOCUMENTS

| | | | |
|---|---|---|---|
| 4,684,113 | 8/1987 | Douglas et al. | 269/21 |
| 5,120,033 | 6/1992 | Shoda | 269/21 |
| 5,143,360 | 9/1992 | Wilken et al. | 269/21 |
| 5,163,793 | 11/1992 | Martinez | 269/309 |

FOREIGN PATENT DOCUMENTS 3316980 5/1983 Fed. Rep. of Germany ........ 269/21

*Primary Examiner*—Robert C. Watson
*Attorney, Agent, or Firm*—Bucknam and Archer

[57] ABSTRACT

A device for supporting slabs during the phases of punching and in general operations of plastic deformation has a plurality of jacks (6) placed under the slab in a position corresponding to at least a substantial portion of the surface of the slab during all the operations being carried out on the slab. These jacks are normally placed in contact with the lower surface of the slab and are capable of lowering for the purpose of avoiding interference with the portions of the slabs which have already been plastically deformed.

3 Claims, 2 Drawing Sheets

DEVICE FOR SUPPORTING SLABS DURING THE PHASES OF PUNCHING AND IN GENERAL OPERATIONS OF PLASTIC DEFORMATION

FIELD OF THE INVENTION

The present invention relates to a device capable of supporting slabs during the phases of punching and in general operations of plastic deformation.

Metallic slabs which may have, but not necessarily, a planer surface are used to produce a great number of apparatuses for both domestic as well as industrial use, such as for instance, refrigerators, washing machines, furniture, etc. Very frequently these slabs must be punched or in any event subjected to operations of plastic deformation, which operations, to a great extent, are carried out with machines which comprise a turret provided with a great number of tools for the purpose of carrying out the several operations on the surface of the slab. The slab in addition is placed in motion by a suitable manipulator along two axes and the entire assembly is regulated by a control device which operates in such a manner that the desired operations may be carried out in sequence on the several areas which have been previously selected on the slab being worked.

The crucial feature inherent to these devices consists of the supporting plane for the same slab. At present, there are provided planes equipped with anti-friction supporting means for the slabs. These devices may comprise load bearing balls of the type with recirculation or brushes with bristles for supporting the slabs or other supporting means.

In every case, it is clear that the bends and the plastic deformations carried out downwardly may extend at the most for a few millimeters for the purpose of avoiding any interference with the tools used to support the slab.

Another alternative has been proposed according to which the devices are very complicated from the constructive point of view as well as the functional point of view, the devices being capable of withdrawing the supporting plane from below a portion of the slab when the latter has already been subjected to the operations of plastic deformations.

All these devices inherently require a great deal of time for the operation so that the operating time is prolonged.

SUMMARY OF THE INVENTION

The object of the present invention is to provide a supporting device for the slab during the phases of punching and operations of plastic deformation in general, which device permits to carry out these operations without limitation with respect to the depth. Further, the device according to the present invention is simple from the constructive as well as the functional point of view and permit it to be operated quickly.

The crux of the present invention resides in providing the supporting device with a plurality of jacks which are placed under the slab corresponding at least to a substantial portion of the entire surface of the slab. These jacks are placed at a distance among themselves which is substantially less than the extension of the two main dimensions of the slab.

Every one of these jacks has a stem which ends in the upper part with a mushroom head and at the top of the head there is provided a device of the blow-by balls. Every one of the heads under normal conditions is placed in contact with the lower surface of the slab. There is also provided a control system for controlling the jacks, capable of lowering the stems of the jacks for the purpose of avoiding interference between the heads of the jacks and the portions of the slab which have already been deformed downwardly.

It is clear that the device according to the present invention is capable of avoiding the drawbacks previously described, particularly allowing operations of plastic deformation without any limitation with respect to the depth.

Another advantage of the present invention is that the apparatus is simple from both the constructive point of view as well as the functional point of view.

Still another advantage is that the jacks, particularly the jacks of the pneumatic type, are capable of operating with great speed, thus permitting to carry out the desired operation of plastic deformation without causing inconvenience with respect to the potential operativeness of the equipment required for the operation.

BRIEF DESCRIPTION OF THE DRAWINGS

The above characteristics and other characteristics of the invention will be described hereinbelow in detail with reference to a particular embodiment of the invention which is offered by way of non-limitative example by reference to the accompanying drawings of which.

DESCRIPTION OF THE PREFERRED EMBODIMENT

Figure 1:
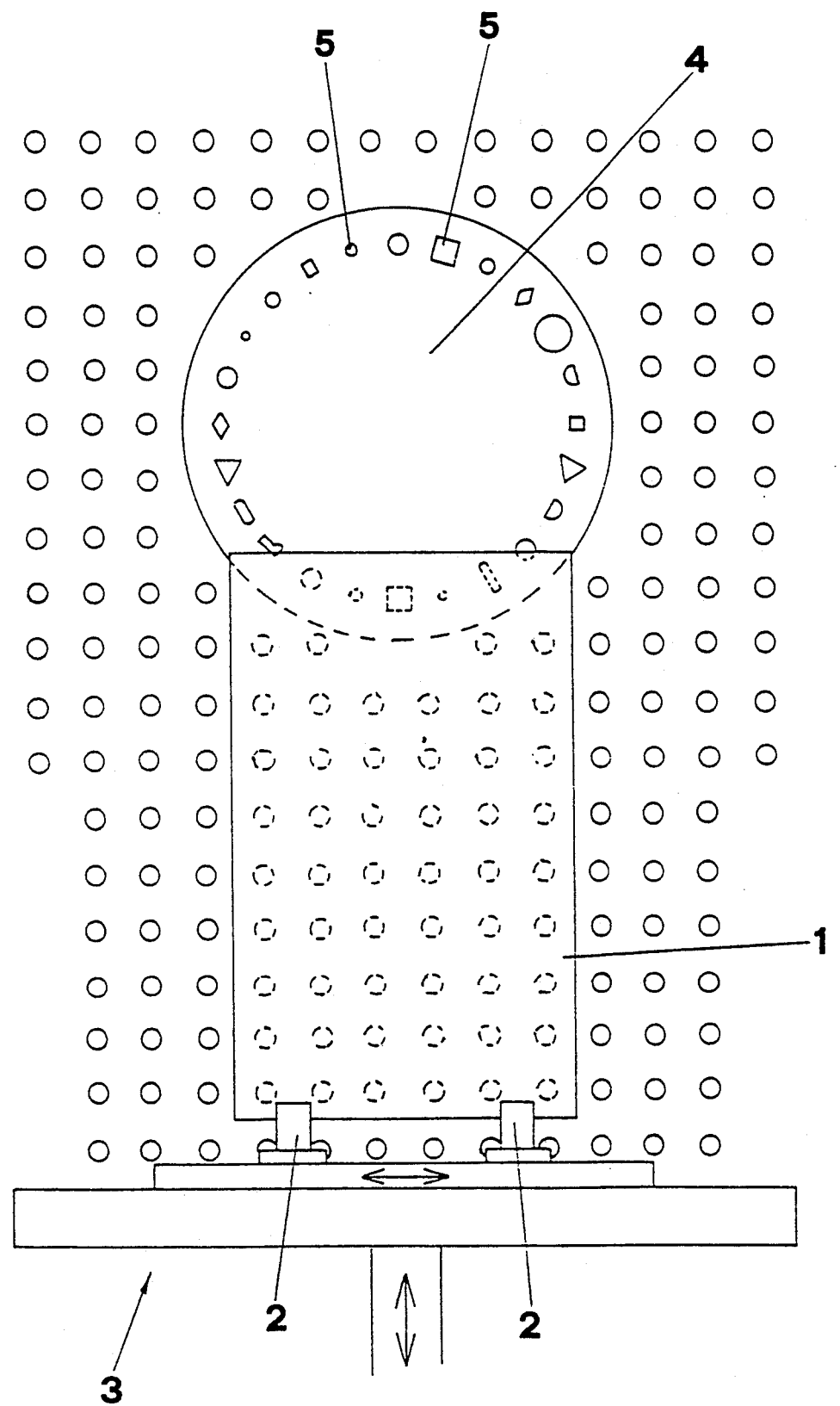
FIG. 1 illustrates a top plan view of the device of the invention and the tools being used for imparting motion as well as tools required for the plastic deformation of the slab.

With reference to the drawings, numeral (1) designates the slab being worked on. The slab is grasped corresponding to its border by a pair of pincers (2), which are part of manipulator (3) of known type for the purpose of imparting to the slab motions along two axes.

On top of the slab there is placed a turret (4), provided with a plurality of tools (5) capable of drilling, punching, drawing or in general imparting plastic deformation to some portions of the same slab.

The several tools may be placed in rotating motion around the vertical axis of the turret in a manner to place the same tools in the desired location. In actual practice, the accurate positioning of the tools in addition to the various motions imparted by the manipulators to the slab, permits to achieve the desired operations of plastic deformation in any portion of the slab.

Figure 2:
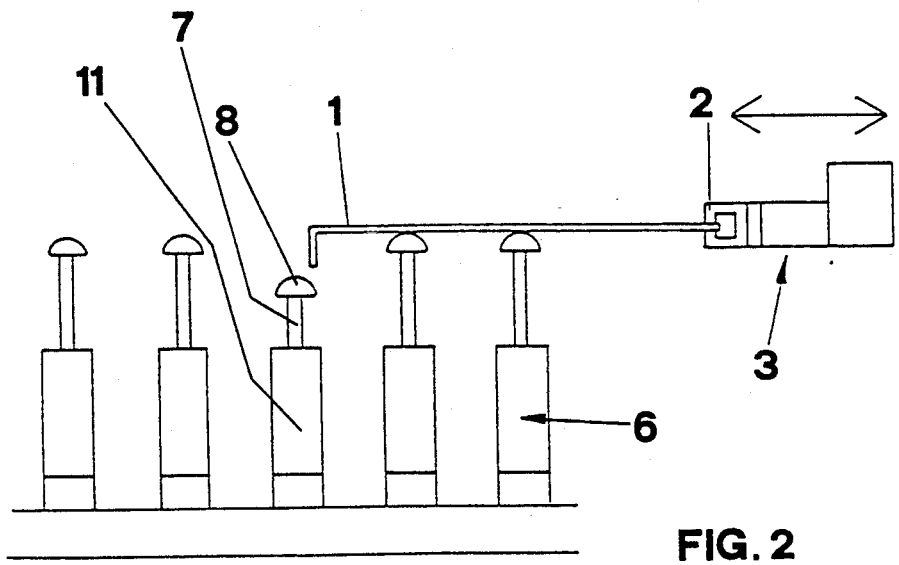
FIGS. 2 and 3 illustrate a side view of a portion of the device of the invention.

A fundamental feature of the device of the invention resides in the fact that a plurality of jacks (6) are placed under the slab corresponding substantially to the entire surface of the slab as shown in FIG. 2. Actually, as shown in FIG. 1, the jacks can extend also outside of the perimeter of the slab, naturally for the purpose of supporting also slabs of greater surface as well as different shapes.

These jacks, which will be preferably placed at the apexes of a square or rectangular grid, will be placed at a distance among themselves substantially less with respect to the extension of the two main dimensions of the slab.

Figure 4:
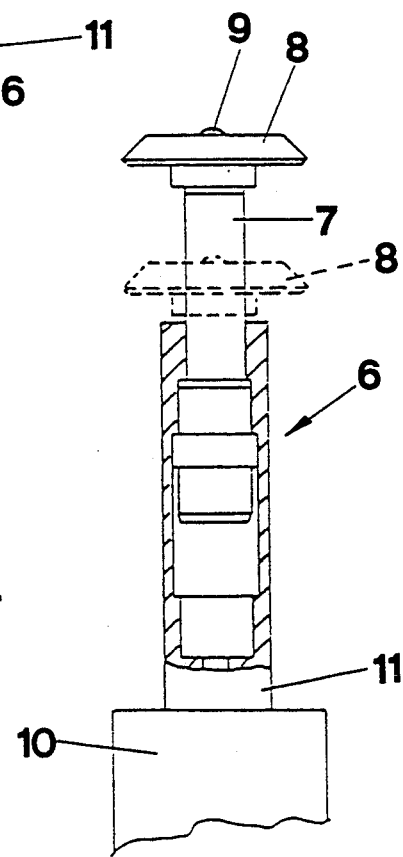
FIG. 4 is a longitudinal cross section of the preferred jacks used in the device of the invention.

As shown in FIG. 4, each jack has a stem (7) which has in the upper part a head (8) in the shape of a mushroom and corresponding to the top part of the head there is provided a device (9) of the with load bearing rotating balls. The heads of the jacks under normal conditions are placed in contact with the lower surface of the slab.

Figure 3:
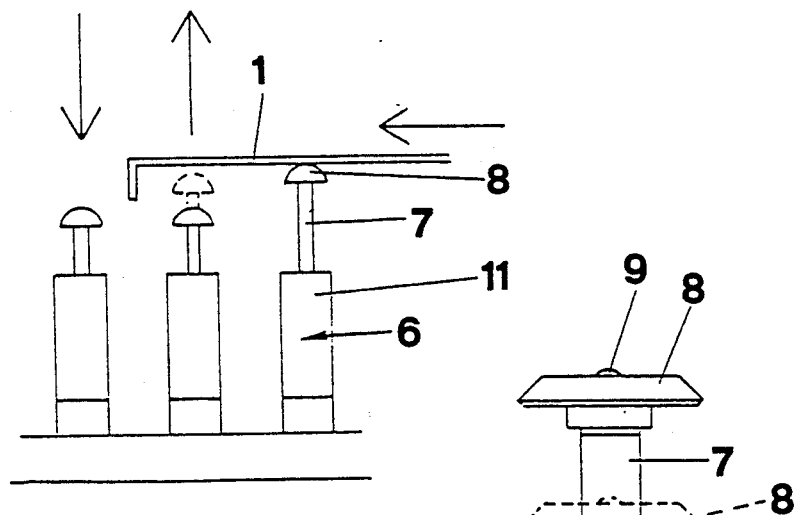

A suitable system of control and command of the jacks is used to determine the lowering of the stems (7) when the slab has been plastically deformed downwardly for the purpose of avoiding interference between the heads (8) and the portions which have been deformed as shown in FIG. 3. It should be noted, however, that there is no danger of interference between the tools (5) and the jacks (6) because the tools are caused to operate in an area in which the jacks are not present as shown in FIG. 1. The actual position of the slabs naturally will be determined by the manipulator (3). The lowering of the stems (7) and therefore the heads (8) is carried out for the period necessary and sufficient to avoid interference mentioned hereinabove, after which the stems will return to the upward position for the purpose of permitting effective supporting action for the slabs.

FIG. 4 shows that advantageously all the jacks are fed by a single reservoir of air (10) to which they are connected by means of a controlling valve (11).

What is claimed is:

1. A device for supporting a slab (1) during the phases of punching and operations of plastic deformation, said punching and said operations of plastic deformation being carried out by a plurality of tools (5) located above said slab, said slab being movable along two axes, which comprises a plurality of jacks (6), said slab having a lower surface, said slab having two main dimensions, said jacks being placed under said slab (1) in a location corresponding to at least a substantial portion of said surface of the said slab, said jacks being placed at a distance one from the other, said distance being substantially less than the extension of the two main dimensions of said slab, each of said jacks having a stem (7), said stem having in its upper part a mushroom head (8), said head (8) having a top part, a device (9) having load bearing rotating balls being placed on said top part, each of said heads being in contact with said lower surface of said slab, a control system for controlling each of said jacks adapted to lower each of said stems of each of said jacks at a time for an interval of time necessary to avoid interference of said jack with the portions of said slab which have been deformed downwardly, said control systems comprising a reservoir of air (1) and a control valve (11).

2. The device according to claim 1 wherein said jacks are located in a position corresponding to the apexes of a rectangular grid.

3. The device according to claim 1 wherein said jacks are located in a position corresponding to the apexes of a square grid.

* * * * *